US005446291A

United States Patent [19]

Becker et al.

[11] Patent Number: 5,446,291

[45] Date of Patent: Aug. 29, 1995

[54] METHOD FOR CLASSIFYING VEHICLES PASSING A PREDETERMINED WAYPOINT

[75] Inventors: Gunnar Becker, Bremen; Norbert Börsken, Ottersberg-Fischerhude; Alwin Güdesen, Morsum; Jürgen Klemp, Achim; Günter Tummoscheit, Oyten; Gordian Vilmar, Bremen, all of Germany

[73] Assignee: Atlas Elektronik GmbH, Lilienthal, Germany

[21] Appl. No.: 193,846

[22] Filed: Feb. 9, 1994

[30] Foreign Application Priority Data

Feb. 15, 1993 [DE] Germany .................... 43 04 298.8

[51] Int. Cl.$^{6}$ .................... G01N 21/86

[52] U.S. Cl. .................... 250/559.24; 340/942

[58] Field of Search .................... 250/560; 340/942; 382/30; 356/376, 384, 385, 386, 387

[56] References Cited

U.S. PATENT DOCUMENTS

| | | | |
|---|---|---|---|
| 3,167,739 | 5/1960 | Girard et al. | 340/38 |
| 3,872,283 | 3/1975 | Smith et al. | 235/150.2 |
| 4,158,832 | 6/1979 | Barnes, Jr. et al. | 340/385 |
| 4,284,971 | 8/1981 | Lowry et al. | 340/52 R |
| 4,747,353 | 8/1990 | Quinlan, Jr. | 364/562 |
| 5,083,200 | 1/1992 | Deffontaines | 358/105 |

*Primary Examiner*—David C. Nelms

*Assistant Examiner*—Steven L. Nichols

[57] ABSTRACT

A method for classifying vehicles passing a predetermined waypoint, for a refined classification within specific vehicle categories such as tracked or wheeled vehicle categories, where the distance to the vehicle passing the waypoint is continuously actively optically measured along a measuring line extending through the waypoint, from a fixed measuring location disposed transversely on the side of the road, and the speed of the vehicle passing the waypoint is additionally measured. The spatial distance between the measured values in the direction of the longitudinal axis of the vehicle is determined from the vehicle speed and the measuring frequency, and a measurement profile of the undercarriage of the vehicle is created by plotting the measured values spaced at the specific spatial distance in the direction of the longitudinal axis. The measurement profile is compared, either indirectly by the derivation of undercarriage parameters, such as number of axles, axle spacing and wheel diameter, or directly with known reference vehicles. The vehicle is classified as that reference vehicle for which the coincidence or correlation is the greatest.

19 Claims, 3 Drawing Sheets

METHOD FOR CLASSIFYING VEHICLES PASSING A PREDETERMINED WAYPOINT

CROSS-REFERENCES TO RELATED APPLICATIONS

The present application claims the right of foreign priority with respect to German Application No. P 43 04 298.8 filed on Feb. 15, 1993, the subject matter of which is incorporated herein by reference.

BACKGROUND OF THE INVENTION

The invention relates to a method for classifying vehicles passing a predetermined waypoint on a road.

It is necessary for military reconnaissance to detect in a timely fashion and reliably analyze the movements of troop units in an assembly area. For this purpose, the observation of vehicle movements along specific road segments is indispensable for determining not only the number but also the type of vehicles passing a waypoint.

U.S. Pat. 4,158,832 discloses a known method for classifying vehicles passing a predetermined waypoint in which a seismic detector buried in the ground near the monitored road segment is used to distinguish between tracked vehicles, such as tanks or the like, and wheeled vehicles, such as semitrailer trucks, motor trucks and the like. The driving and engine noises generated by the vehicles are absorbed into the ground and propagate in the ground as seismic or solid-borne sound waves. These solid-borne sound waves are received by the seismic detector, which is preferably embodied as a geophone. With the aid of suitable signal-processing methods, criteria are obtained from the output signals of the geophone that permit the identification of the received solid-borne sound waves as being emitted from a tracked or a wheeled vehicle.

Such a seismic detection and classification method allows the distinction of certain generic types of vehicles, such as wheeled and tracked vehicles, from one another. However, a distinction cannot be made between specific vehicle types within a generic type, such as between heavy, multiple-axle semitrailer trucks and lighter trucks having one or several driving axles, or between tanks and lighter, likewise tracked, patrol vehicles.

SUMMARY OF THE INVENTION

The object of the invention is to disclose a vehicle classification method that detects vehicles passing a waypoint and can distinguish them with sufficient precision as required for military reconnaissance purposes. Even vehicles having the same general structural features, such as tracks or wheels, are intended to be categorized, that is, further classified with this method into different vehicle types within their generic type.

The object is attained with a method for classifying a vehicle passing a predetermined waypoint on a road, comprising the steps of: measuring, at a measuring frequency (F), successive measured distance values from a measuring location on a side of the road, along a fixed measuring line extending through the waypoint and across the road, to the undercarriage of the vehicle passing the waypoint; measuring a speed (v) of the vehicle passing the waypoint; determining a spatial distance (ΔL), between adjacent measured distance values along a longitudinal axis of the vehicle, from the speed (v) and the measuring frequency (F); creating a measurement profile for the undercarriage of the vehicle, with the measurement profile having a series of the successive measured distance values spaced at the spacial distance (ΔL); and comparing the measurement profile to reference data of known reference vehicles to classify the vehicle passing the predetermined waypoint.

In the method according to the invention, a profile of the undercarriage in the direction of the longitudinal axis of the vehicle is obtained by measuring the distance to a vehicle passing the waypoint. Characteristic undercarriage parameters are derived from this profile and at least these undercarriage parameters are used to identify the vehicle. Examples of these characteristic undercarriage parameters, which are only specific for certain vehicle types and are therefore the most suitable for their identification, are the number of wheels, the number of wheel axles, the spacings of the wheel axles, the diameter of the vehicle wheels, and types of wheel covers in tracked vehicles, as well as vehicle aprons and the like. These undercarriage parameters measured in the longitudinal direction of the vehicle are compared with similar undercarriage parameters of known reference vehicles and, if there is sufficient coincidence, the measured vehicle is identified as being a particular known reference vehicle.

According to one embodiment of the invention, it is possible, to indirectly compare the measurement profiles of the vehicle to be identified to the known reference vehicles by extracting the typical undercarriage parameters from the measurement profile of the vehicle to be identified and comparing them with the corresponding undercarriage parameters of the known reference vehicles. According to a further embodiment of the invention, it is possible to directly compare the measurement profiles of the vehicle to be identified to the known reference vehicles by creating a simulated measurement profile of the undercarriage for each of the reference vehicles, from the typical undercarriage parameters of the reference vehicles and the measurement distance above the road surface, and correlating these simulated measurement profiles directly with the measurement profile of the vehicle to be identified.

With the above-mentioned undercarriage parameters and the combination thereof in a measured vehicle, not only can wheeled vehicles be subdivided into different categories, but various types of tracked vehicles can also be identified, because the number of track rollers, their diameter, wheel spacing, and wheel covers are different for the various types of tracked vehicles.

Advantageous embodiments of the method of the invention, with useful features and improvements of the invention, and a device for implementing the method are described in more detail below.

In accordance with a preferred embodiment of the method of the invention, to obtain characteristic parameters from the measurement profile of the undercarriage, section lengths are defined by the addition of the measured spacial distances along the longitudinal axis of the vehicle of successively measured distance values having nearly identical magnitude, and the position of the individual section lengths is also determined. Measured distance values of identical magnitudes result when the distance is measured to the same undercarriage part, so that the section lengths reflect the lengths of these undercarriage parts along the longitudinal axis of the vehicle. Because the measuring height, that is, the distance of the measuring line from the earth's surface, is kept very small in accordance with the invention, identical section lengths appearing repeatedly, that is, at least twice, in the measurement profile characterize secant segments of the vehicle wheels extending parallel to the earth's surface. Because of the known measuring height and known geometrical relationships, the wheel diameter can be determined from the section length. Each wheel axle is on the vertical center line of the respective section length, and the spacing of the wheel axles can thus be derived directly from the measurement profile. The vehicle passing the waypoint is then classified based on the number of coincidences of the undercarriage parameters with corresponding undercarriage parameters of one of the known reference vehicles.

In contrast to video monitoring of a road section, or monitoring of the road section with a thermal imaging camera, the method based on the distance measurement to the vehicle has the advantage that, to create an informative measurement profile, a small amount of data is processed and transmitted to the appropriate evaluation points. In the method according to the invention, the measured values are relatively insusceptible to transmission errors. A measuring device for executing the distance measurement can therefore be produced very economically and several measuring devices can be installed at different waypoints. The evaluation of the measurement values at the individual measuring locations, that is, the creation of the measurement profile, the extraction of undercarriage parameters and the comparison with reference vehicles can be executed for all of the measuring devices in a central evaluation station remote from the measuring devices. Thus only a single central evaluation station is required for numerous waypoint stations.

BRIEF DESCRIPTION OF THE DRAWINGS

The invention is described in detail below by way of preferred embodiments shown in the drawings.

DETAILED DESCRIPTION OF THE PREFERRED EMBODIMENTS

Figure 1:
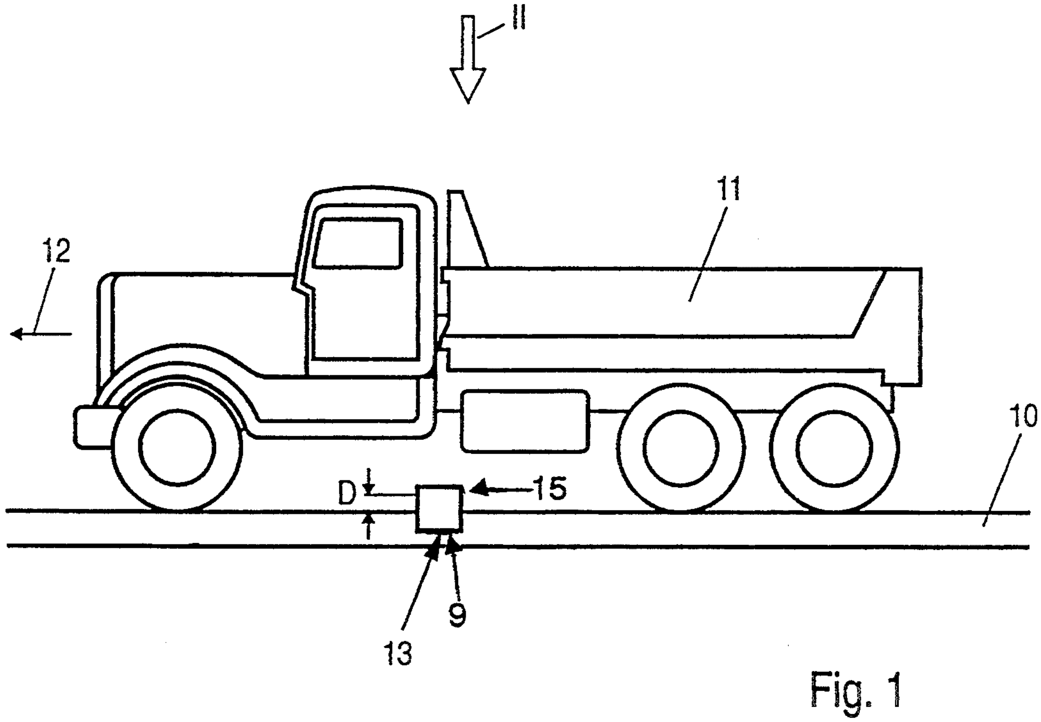
FIG. 1 is a schematic side view of a motor truck driving on a road, with a measuring device, according to an embodiment of the invention, disposed transversely on the side of the road.

As shown in FIG. 1, vehicles that pass a predetermined waypoint 9 on a road 10 are detected and identified with the classification method described below.

It is presupposed that the vehicles pass waypoint 9 one after the other, and not simultaneously, which is usually the case if the waypoint is suitably selected. The method is described below for identification of a vehicle 11 which is, for example, a truck having a dual rear axle that is moving on road 10 in the direction of travel shown by arrow 12, and in the process passes predetermined waypoint 9.

Figure 2:
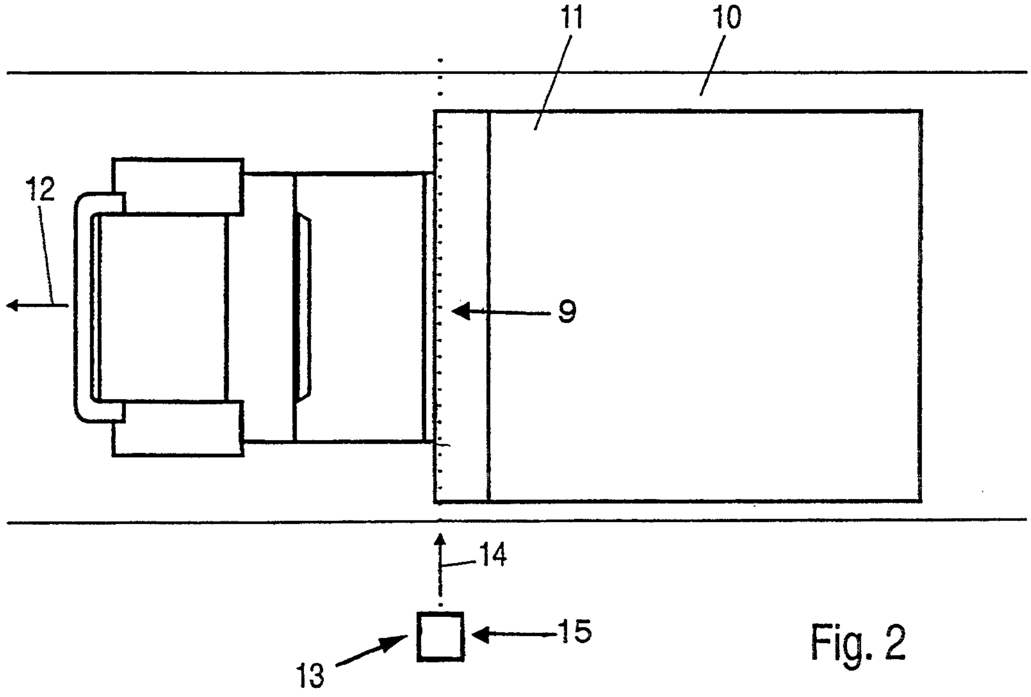
FIG. 2 is a schematic top view of the vehicle and the measuring device in accordance with arrow II in FIG. 1.

As shown in FIG. 2, the distance from the undercarriage of vehicle 11 is continuously measured from a measuring location 13 disposed on the side of road 10 along a fixed measuring line 14 extending through predetermined waypoint 9. In this case, the distance measurement is an active optical measurement taken by means of a known laser distance-measuring device 15 installed at measuring location 13 and emitting a light beam with an infrared laser along the measuring line 14 while its receiver receives the light reflected from the undercarriage parts of vehicle 11. The distance to the vehicle 11 is determined from the received signals by means of an evaluation unit. The laser beam may comprise pulsed or modulated light. When the light pulses are emitted and reflected, the time delay of the respective laser pulse is measured, and the distance from laser distance-measuring device 15 to vehicle 11 is determined from this time delay.

Measuring line 14 is oriented at a right angle to the direction of travel 12 of vehicle 11, that is, at a right angle to the road 10, to avoid problems resulting from the aspect angle in the distance measurement. Measuring line 14 maintains the smallest possible distance D from the surface of road 10, which is typically approximately 20 cm. The following criteria are used to select an optimum measuring height D: the measurement should betaken higher than the uneven points in the road, for example on gravel roads; with motor vehicles, the measurement should also distinguish closely adjacent wheels or track rollers from one another, that is, the gaps between the wheels or track rollers should be as large as possible; measuring line 14 should be located below the wheel axles, because the undercarriage is often covered above the axles by aprons and the like.

In addition to the continuous distance measurement, the driving speed v of vehicle 11 is measured as vehicle 11 passes predetermined waypoint 9. The driving speed v can be measured by means of various methods, for example, by arranging two sensors that are spaced from one another in the direction of travel 12 of vehicle 11, and detecting the passing vehicle and determining the time difference. For instance, the vehicle may be detected by means of magnetic sensors that detect the changes in the earth's magnetic field as the vehicle passes.

Figure 3:
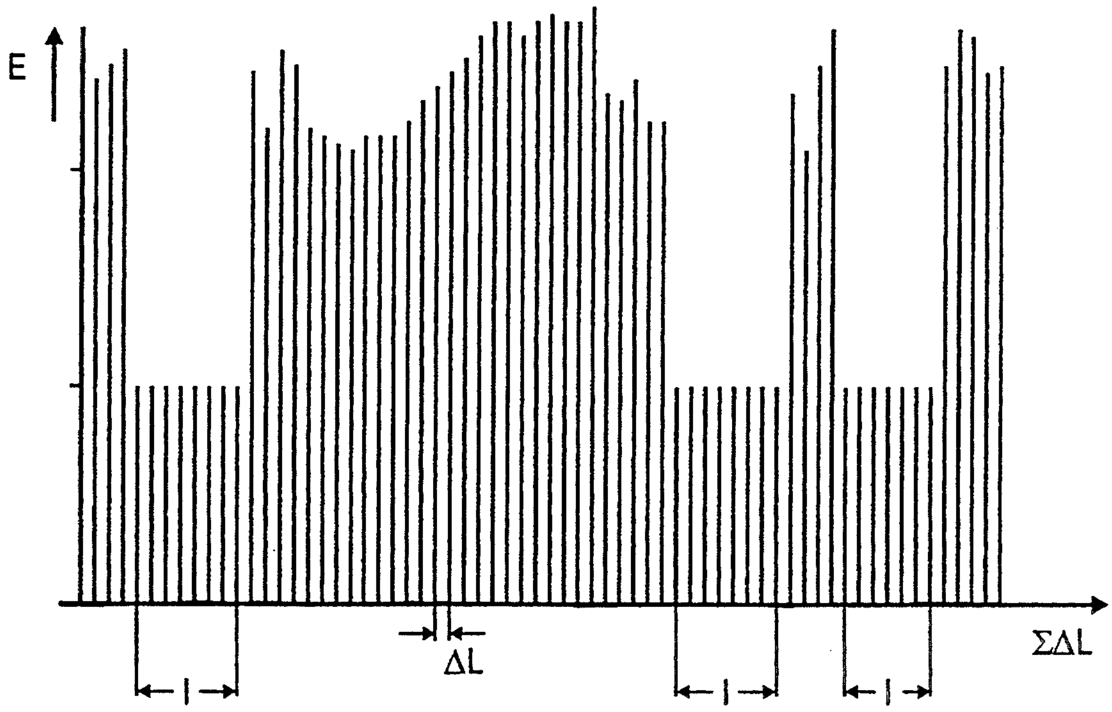
FIG. 3 is a schematic representation of a measurement profile of the undercarriage of the vehicle obtained by the measuring device in FIGS. 1 and 2.

The spatial distance $\Delta L$ (see FIG. 3) between the adjacent or successive measured values E along the longitudinal axis of the vehicle is calculated from the known measuring frequency F of the distance measurement and the measured vehicle speed v. As shown in FIG. 3, a measurement profile of the undercarriage of vehicle 11 is created from this spatial distance $\Delta L$ and the measured values E. In the measurement profile, the successively detected measured distance values are serialized in a direction that corresponds to the longitudinal axis of the vehicle at an interval predetermined by the calculated spatial distance $\Delta L$. The magnitude of the measured value, that is, the measured distance E, is plotted on the ordinate, and the number of measurements with successive spatial distances $\Delta L$ is plotted on the abscissa.

It can clearly be seen in the measurement profile that some of the successive measured values have the same measured value magnitude, which means that these measured values originate from the same undercarriage part of vehicle 11. To evaluate the measurement profile for the purpose of identifying and classifying vehicle 11, section lengths I are defined by means of addition of the spatial distances ΔL of successive measured values that have a measured value nearly identical in magnitude, and the position of these section lengths I within the measurement profile is determined. Because of measuring height D, that is, the distance of measuring line 14 from the surface of road 10, and the repeated appearance of identical section lengths I in the measurement profile shown, it can be assumed that the measured values within section lengths I derive from the vehicle wheels of vehicle 11, i.e., section lengths I represent secants of the vehicle wheels that extend parallel to road 10.

Figure 4:
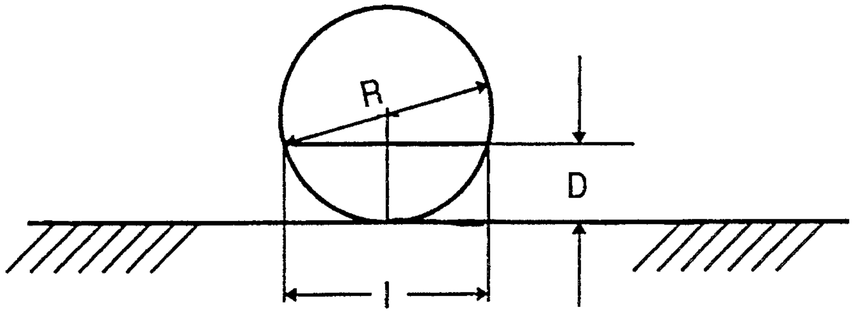
FIG. 4 is a schematic representation of the geometric relationships for determining a wheel diameter R.

FIG. 4 shows the geometric relationships at the vehicle wheel, taking into account measuring height D and section lengths I. As can clearly be derived from FIG. 4, diameter R of the vehicle wheel can be calculated from section length I as follows:

$$R=D+I^2/4D \quad (1)$$

A first characteristic undercarriage parameter for vehicle 11 is thus derived from the measurement profile. To reduce errors by eliminating physically impossible wheel diameters, a calculated wheel diameter R is only accepted if the following condition is fulfilled:

$$D/2<R<3m \quad (2)$$

If R is greater than 3 m, section length I cannot originate from a vehicle wheel, but rather must derive from a lateral apron. If R is less than D/2, section length I is inaccurate because this implies that the measuring height (D) is above the center axle of the vehicle wheel.

The center point of the wheel, and therefore the location of the wheel axle, is located on the vertical center line of section length I. The spacing of the wheel axles can readily be determined from the measurement profile. Thus, a further undercarriage parameter that helps identify vehicle 11 is known. The number of wheel axles, in this case three, can readily be determined from the presence of three section lengths I that characterize vehicle wheels. Thus, a further undercarriage parameter for vehicle 11 is known.

The undercarriage parameters as derived above, namely the number of wheel axles, the spacing of the wheel axles and the diameter of the wheels, are compared with a number of corresponding undercarriage parameters of known reference vehicles, and measured vehicle 11 is identified or classified as that reference vehicle for whom the sum of the undercarriage parameters deviates the least from the three undercarriage parameters derived from the measurement profile. In this case, vehicle 11 is identified as a truck that has two rear axles of a particular type. The vehicle data, such as maximum allowable load weight, empty weight, etc., can then be looked up for the identified reference vehicle.

According to a further embodiment of the invention, to evaluate the measurement profile for the purpose of identifying vehicle 11 passing waypoint 9, the method may also be to generate a number of simulated undercarriage profiles, referred to hereinafter as reference profiles, from the undercarriage parameters of a number of known reference vehicles, with the inclusion of measuring height D of measuring line 14. These reference profiles have the same configuration as the measurement profile shown in FIG. 3. The thus obtained simulated reference profiles of the reference vehicles are successively correlated with the measurement profile, in accordance with FIG. 3, of vehicle 11 to be identified. Vehicle 11 to be identified is then classified as that reference vehicle whose reference profile, correlated with the measurement profile in FIG. 3, yields the greatest correlation factor, that is, most closely approaches a correlation factor of one. In this regard, a threshold value for the correlation factor can simultaneously be determined, beyond which an association of the vehicle 11 to a reference vehicle is allowable, so that erroneous classifications can be greatly eliminated.

Figure 5:
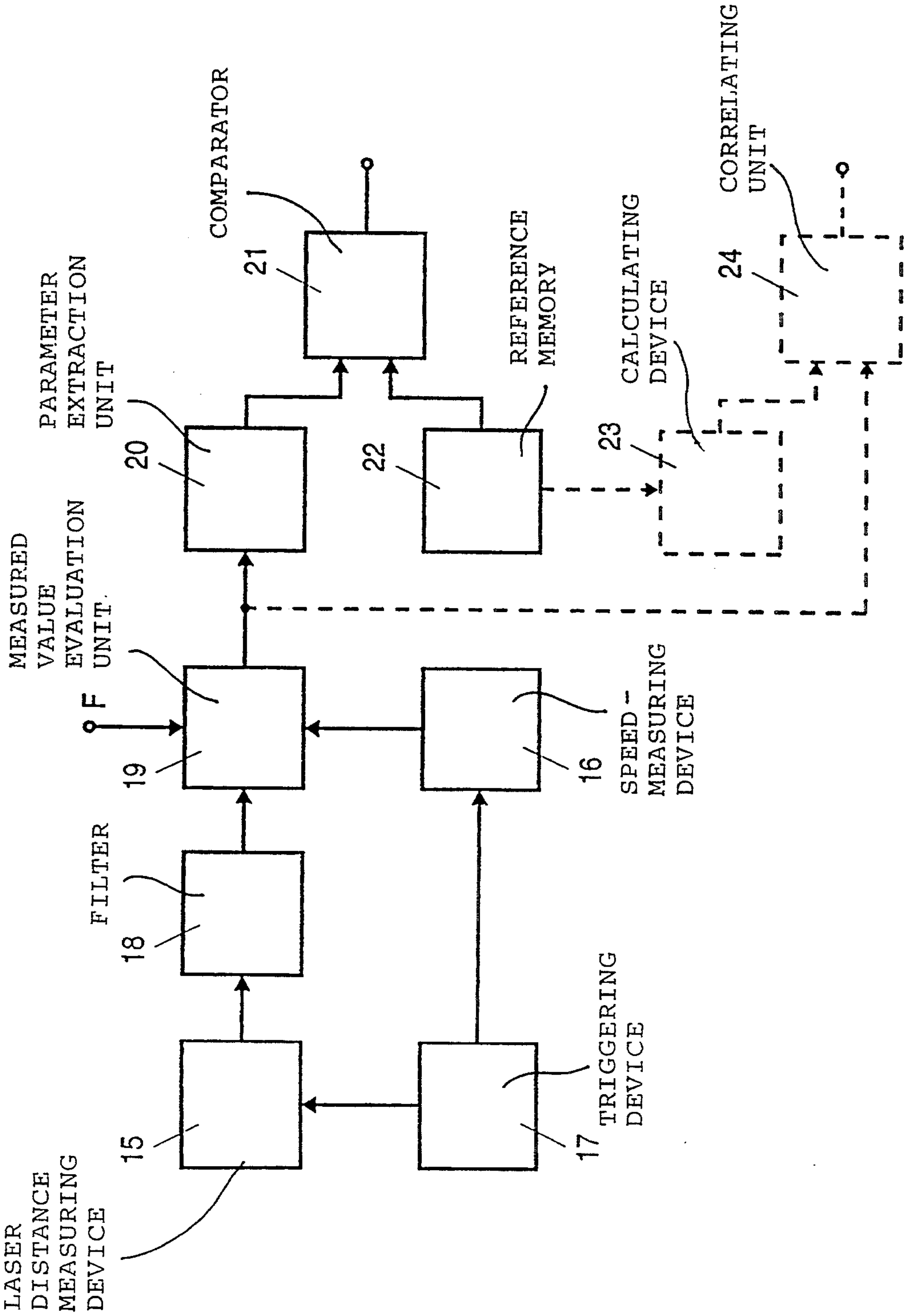
FIG. 5 is a schematic circuit diagram of a device, according to an embodiment of the invention, for executing the classification method.

FIG. 5 is a block circuit diagram of a device for executing the method for classifying vehicles described above. Laser distance-measuring device 15 and speed-measuring device 16 are activated by a triggering device 17 when a vehicle 11 approaches predetermined measuring location 13 through which measuring line 14 passes. Triggering device 17 may be, for example, a passive sensor mechanism, for example magnetic sensors that register a change in the magnetic field caused by the approaching vehicle 11.

When activated by the trigger device 17, laser distance-measuring device 15 and speed-measuring device 16 enter their measuring mode. That is, with the measuring frequency F, laser distance-measuring device 15 continuously measures along measuring line 14 the measured distance E to a vehicle 11 which passes across measuring line 14. At the same time, speed-measuring device 16 measures the momentary driving speed v of vehicle 11 as it passes across measuring line 14. The measured distance values output by laser distance-measuring device 15 are fed to a filter 18, in which distance values measured erroneously, for example because of a distorted laser reflection, are identified and removed.

The filtered measured distance values are output from filter 18 to a measured value evaluation unit 19 that additionally receives, from speed-measuring device 16, a speed measurement signal representing driving speed v, and receives, from laser distance-measuring device 15, a signal that indicates the measuring frequency F. Measured value evaluation unit 19 calculates the spatial distances ΔL between the individual filtered measured distance values in the direction of the longitudinal axis of vehicle 11 from the quotient of vehicle speed v and measuring frequency F in accordance with the equation:

$$\Delta L=v/F \quad (3)$$

Measurement evaluation unit 19 creates a measurement profile, as shown in FIG. 3, with the calculated spatial distance ΔL and supplies the measurement profile to a parameter extraction unit 20. As described above, extraction unit 20 detects typical undercarriage parameters, such as wheel diameter, the number of wheel axles and wheel spacings, from the measurement profile and supplies the undercarriage parameters detected in this way to a comparator 21.

Undercarriage parameters from known reference vehicles are stored in a reference memory 22 in association with these reference vehicles. These undercarriage parameters are read successively from reference memory 22 into the comparator 21. Comparator 21 detects the degree of coincidence between all undercarriage parameters of each reference vehicle from reference memory 22 and the undercarriage parameters of the vehicle 11 to be identified from extraction unit 20, and selects the reference vehicle with which the degree of coincidence is the greatest. Vehicle 11 to be identified is classified as the reference vehicle with the greatest coincidence and an indication of the selected reference vehicle is output from comparator 21.

In a further embodiment of the invention, a calculating device 23 and a correlating unit 24 may be provided in place of parameter extraction unit 20 and comparator 21. Taking into consideration the measuring height D, a simulated reference profile, configured identically to the measurement profile for the undercarriage of the vehicle 11 as shown in FIG. 3, for each of the stored reference vehicles is created by calculating device 23 from the undercarriage parameters belonging to the reference vehicles stored in reference memory 22.

The measurement profile created in measured value evaluation unit 19 for the undercarriage of vehicle 11 to be identified is supplied to correlation unit 24. Correlation unit 24 correlates this measurement profile successively with each of the reference profiles calculated by calculating device 23 for the known reference vehicle undercarriages, and determines a respective correlation factor. The maximum correlation factor, which preferably must additionally exceed a threshold, is determined from the correlation factors. The reference vehicle that yields this maximum correlation factor is designated as a classification vehicle, that is, vehicle 11 to be identified is classified as the reference vehicle with the maximum correlation factor and an indication of the selected reference vehicle is output from correlation unit 24.

The invention is not limited to the preferred embodiments described. Thus, referring to FIGS. 1 and 2, if road 10 has slopes which leave little space for the establishment of measuring location 13 near road 10, an optical system having an entrance pupil and an exit pupil, and whose optical axis coincides with the measuring line 14, may be installed at measuring height D at the measuring location 13. The optical system is connected by way of a fiber-optic cable to a laser distance-measuring device 15 installed at a location behind the slope, and coupled there to the laser emitter and receiver of laser distance-measuring device 15. In this instance, the fiber-optic cable may be positioned randomly, even guided through the slope or buried in the ground. During distance measurements, the length of the fiber-optic cable must be taken into consideration. It is possible to provide the optical system with a separate entrance and exit pupils that are each connected by way of separate fiber-optic cables to the laser emitter and receiver, respectively. It is also possible, however, to combine the entrance and exit pupils so that only one fiber-optic cable leads to laser distance-measuring device 15.

Obviously numerous and additional modifications and vacations of the present invention are possible in light of the above teachings. It is therefore to be understood that, within the scope of the appended claims, the invention may be practiced otherwise than as specifically disclosed and claimed herein.

What is claimed is:

1. A method for classifying a vehicle passing a predetermined waypoint on a road, comprising the steps of:

measuring, at a measuring frequency (F), successive measured distance values from a measuring location on a side of the road, along a fixed measuring line extending through the waypoint and across the road, to the undercarriage of the vehicle passing the waypoint;

measuring a speed (v) of the vehicle passing the waypoint;

determining a spatial distance (ΔL), between adjacent measured distance values along a longitudinal axis of the vehicle, from said speed (v) and said measuring frequency (F);

creating a measurement profile for the undercarriage of the vehicle, with said measurement profile having a series of said successive measured distance values spaced at said spacial distance (ΔL); and comparing said measurement profile to reference data of known reference vehicles to classify the vehicle passing the predetermined waypoint.

2. A method according to claim 1, wherein said step of comparing said measurement profile to reference data of known reference vehicles includes:

deriving undercarriage parameters for the vehicle from said measurement profile; and comparing said undercarriage parameters for the vehicle to corresponding reference undercarriage parameters for each known reference vehicle.

3. A method according to claim 2, wherein said step of deriving undercarriage parameters includes defining section lengths, each section length (I) being defined by adding said spatial distances (ΔL) for adjacent measured distance values having substantially the same magnitude, and determining a respective position of each section length (I).

4. A method according to claim 3, wherein the number of wheels of the vehicle is one of said undercarriage parameters.

5. A method according to claim 3, wherein axle spacings between wheel axles of the vehicle are one of said undercarriage parameters.

6. A method according to claim 3, wherein diameters of wheels of the vehicle are one of said undercarriage parameters.

7. A method according to claim 6, wherein said step of deriving undercarriage parameters further includes calculating a respective wheel diameter (R) for each wheel according to the following equation:

$$R=D+I^2/4D$$

where D is a distance of said measuring line above the road surface.

8. A method according to claim 7, wherein said step of deriving undercarriage parameters further includes generating a respective allowed wheel diameter equal to said respective calculated wheel diameter (R) for each wheel only if the following relation is true:

$$D/2<R<3m.$$

9. A method according to claim 8, wherein said step of deriving undercarriage parameters further includes determining respective spacing between each wheel axle of the vehicle from said positions of section lengths (I) corresponding to said respective allowed wheel diameters.

10. A method according to claim 2, wherein said step of comparing said undercarriage parameters for the vehicle to corresponding reference undercarriage parameters for each known reference vehicle includes identifying the vehicle based on the greatest coincidence between said undercarriage parameters for the vehicle and said corresponding reference undercarriage parameters.

11. A method according to claim 1, further comprising a step of generating respective simulated undercarriage profiles for each known reference vehicle from respective reference undercarriage parameters for each known reference vehicle and a measuring height (D) of said fixed measuring line above the road surface; wherein said step of comparing said measurement profile to reference data of known reference vehicles includes correlating said measurement profile for the undercarriage of the vehicle to said respective simulated undercarriage profiles for each known reference vehicle; and further comprising a step of identifying the vehicle based on the greatest correlation between said measurement profile for the undercarriage of the vehicle and said respective simulated undercarriage profiles for each known reference vehicle.

12. A method according to claim 1, wherein said fixed measuring line is oriented substantially horizontally and at a right angle to a driving direction of the vehicle, and is located at a measuring height (D) above the road surface.

13. A method according to claim 12, wherein said measuring height (D) is small relative to the radius of a wheel of a vehicle to be classified.

14. A method according to claim 12, wherein said measuring height (D) is approximately 20 cm.

15. A method according to claim 1, wherein said step of measuring said successive measured distance values is performed by an active optical measuring device.

16. A method according to claim 15, wherein said active optical measuring device is an infrared laser distance-measuring device having a laser emitter that emits a sharply focused light beam, a receiver that receives a reflection of said sharply focused light beam from the undercarriage of the vehicle and an evaluation unit that calculates the distance to the vehicle from a time difference between the time said light beam is emitted and the time said reflection of said light beam is received.

17. A method according to claim 16, wherein said light beam emitted by said laser emitter and said reflection of said light beam received by the receiver are emitted and received via an optical system installed at the edge of the road at a measuring height (D) above the road surface, said optical system having an entrance pupil and an exit pupil and being connected via at least one fiber-optic cable to said laser emitter and said receiver.

18. A method according to claim 1, further comprising the step of detecting the vehicle, before the vehicle passes the waypoint, to activate a distance-measuring device.

19. A method according to claim 1, wherein said step of determining said spatial distance (ΔL) is performed according to the following equation:

$$\Delta L = v/F.$$

* * * * *